US005579528A

United States Patent [19]
Register

[11] Patent Number: 5,579,528
[45] Date of Patent: Nov. 26, 1996

[54] COMPUTER SYSTEM EMPLOYING DOCKING BAY WITH SPRING LOADED CONNECTOR PINS AND FILE COHERENCY METHOD

[75] Inventor: David S. Register, Austin, Tex.

[73] Assignee: Dell USA, L.P., Austin, Tex.

[21] Appl. No.: 416,550

[22] Filed: Apr. 3, 1995

Related U.S. Application Data

[63] Continuation of Ser. No. 815,474, Dec. 31, 1991, abandoned.

[51] Int. Cl.⁶ .............................. G06F 13/00; G06F 17/00
[52] U.S. Cl. .................. 395/671; 395/200.12; 395/309; 364/704
[58] Field of Search ........................... 235/380; 395/800, 395/325; 364/419, 708

[56] References Cited

U.S. PATENT DOCUMENTS

| | | | |
|---|---|---|---|
| 4,654,818 | 3/1987 | Wetterau, Jr. | 395/500 |
| 4,692,601 | 9/1987 | Nakano | 235/380 |
| 4,692,604 | 9/1987 | Billings | 235/493 |
| 4,870,604 | 9/1989 | Tatsuno | 364/708.1 |
| 5,034,596 | 7/1991 | Utsunomiya | 235/380 |
| 5,051,101 | 9/1991 | Komatsu | 439/159 |
| 5,070,233 | 12/1991 | Takizawa et al. | 235/380 |
| 5,128,523 | 7/1992 | Diehl et al. | 235/441 |
| 5,140,517 | 8/1992 | Nagata et al. | 364/408 |
| 5,151,847 | 9/1992 | Rautenberg | 361/737 |
| 5,168,151 | 12/1992 | Nara | 235/492 |
| 5,191,611 | 3/1993 | Lang | 380/25 |
| 5,225,664 | 7/1993 | Iijima | 235/380 |
| 5,265,238 | 11/1993 | Canova, Jr. et al. | 395/500 |
| 5,452,424 | 9/1995 | Goeppel | 395/650 |

*Primary Examiner*—Thomas G. Black
*Assistant Examiner*—C. Pham
*Attorney, Agent, or Firm*—Henry N. Garrana; Mark P. Kahler; Michelle M. Turner

[57] ABSTRACT

A macro-system which includes at least one portable computer and at least one stationary computer. The stationary computer includes a docking bay into which the portable computer is physically inserted whenever the user has returned with it to his primary work area. This docking station includes contact probes which automatically make contact to a small number of contacts on the back of the portable computer whenever it is stuffed into the docking station. The portable computer preferably includes soft power switch logic, so that an activation signal, received when the portable computer is docked, can be used to wake up the portable computer and bring it up active in a slave operating mode. Appropriate software routines can then be triggered to maintain file coherency.

10 Claims, 14 Drawing Sheets

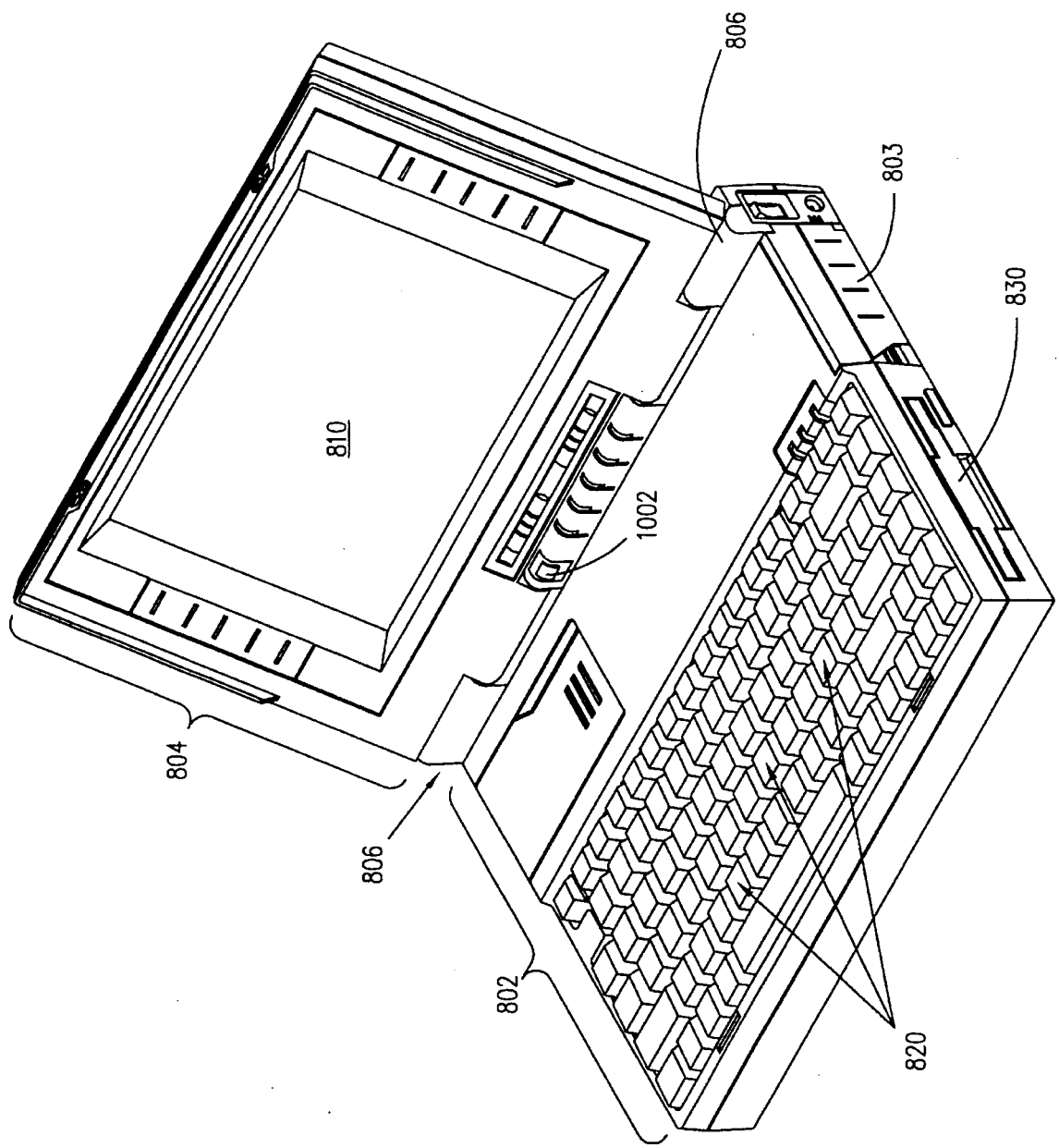

COMPUTER SYSTEM EMPLOYING DOCKING BAY WITH SPRING LOADED CONNECTOR PINS AND FILE COHERENCY METHOD

This application is a continuation of application Ser. No. 07/815,474, filed Dec. 31, 1991 and now abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to computer systems (and particularly to small computer systems), and to methods for using them.

The innovations disclosed in the present application provide computer systems (especially very small portable personal computers) which have advantageous new capabilities. To better explain the significance and advantages of these innovations, the following paragraphs (down to page 7) will review some technological context. This technological context is not necessarily prior art, but is intended to help in pointing out the disclosed inventions.

Laptop and Smaller Computers

Portable personal computers were introduced in the early 1980s, and proved to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

Some Difficulties of Small Size

To meet the weight, volume, and power budgets of small portable computers, much effort has been made to re-engineer familiar components, within the limits of acceptable compromise with user comfort and convenience, to attain the needed portability. For example, almost no laptop or notebook computers have had more than two disk drives (typically one floppy drive and one hard drive); the keyboards are much smaller than would be optimal for touch typists; and the displays are much smaller than on common desktop models.

Where such compromises are needed to attain the overriding goal of portability, users readily accept them. However, if these compromises can be avoided some of the time, it is highly desirable to do so. Thus, for example, many users will "dock" their laptop or notebook computers, when on their desktops, in order to use better peripherals (faster, larger, more heavy-duty, and/or easier to use) than could be carried with the portable computer.

Portable computers are inherently more susceptible than desktop computers to accident, loss, and theft. Thus, if critical work is being done on a portable computer, backup is even more of a necessity than with a desktop computer.

The quantities of mass storage available on portables have steadily increased, but the cost per byte of the necessary ruggedized drives continues to be far above that of that of the drives normally used. This disparity seems likely to continue. Similarly, although some small portables use nonvolatile (or nonvolatized) solid-state memory to replace disk drives, the cost per byte of such memory is likely to continue to exceed that of conventional mass storage devices.

Laptops normally have a severely limited set of external ports. This limitation is imposed by several factors: first, each external connector takes up precious square inches of surface area. Second, each external connector is a point of vulnerability to electrostatic-discharge-induced component failure. Third, each external connector is a possible point of entry for dirt and moisture. Fourth, in calculating the worst-case power budget for a system, the possible power required by all connectors must be considered.

Similar problems arise from the need for bus extension. Internal space is not available for expansion cards, as in a normal personal computer; but needs for expansion still exist. Some small computers have brought out key bus lines into an external connector, but of course this is unwieldy. Other small computers have sent signals out over a port to an independently-powered extension bus controller with bus slots which would emulate the computer's internal bus.

Continuing Advantages of Stationary Personal Computers

The capabilities and cost of both stationary and portable computers have rapidly improved over the years. However, it is likely that stationary personal computers will always have some advantages over lightweight portables: it has always been true that, for a given price, stationary computers have always had more computing horsepower, larger mass storage, better displays, and better user interfaces (including keyboard, mouse, joystick and/or track ball input devices). These advantages are due to the necessary constraints (of weight, volume, power budget, and shock-resistance, and environmental resistance) which necessarily must be met by a small portable computer, and need not be met by a stationary personal computer.

Use of Both a Portable and a Stationary Computer

As small portable computers become ever more common, an increasing number of users prefer to use two computers: one for their desktop, and one more for the road. This increasingly common pattern of usage is very convenient for users, but also generates some problems.

One problem which arises is loss of file coherency: when a user edits a file on his secondary machine, he must transfer that file back to his primary machine before he again edits the same file on the primary machine.

"Docking" a Portable Computer

Users find it very convenient to "dock" a portable computer on their desktop, to a full-size keyboard and/or display. When a portable computer is used in such a configuration, users will also wish to use many of the peripherals (such as printer, modem, fax machine, tape backup devices, or additional disk drives) which are easily available with a desktop computer.

This problem becomes more urgent as useful amounts of computing power become more available in physically small portable computers.

Thus, in general, as convenient as small portable computers are, there is some difficulty getting data into and out of them. Usually the only available data routes are through a modem or through the floppy drive. (Some portable computers have LAN interface cards, but this is an expensive option, and requires a compatible LAN to interface to.) This has been recognized as a problem, and many vendors have offered external drive connections for small portable computers.

Data Interchange with a Portable Computer

Portable computer users frequently desire to exchange data with desktop computer systems. One of many ways to accomplish this data interchange is to connect the portable computer to the desktop computer by means of a cable. This cable typically connects the serial or parallel port of one computer to the corresponding port of the other computer. Data interchange is effected using complementary software programs resident on both computers.

Several problems exist in this scenario. First, the typical desktop computer has I/O ports located on the back panel of the housing. The housing is commonly sited close to a wall or cabinet, or worse, on the floor under or beside the desk. User access to the ports for the purposes of connecting a cable is cumbersome, if not impossible. Further, the required serial or parallel port on the desktop computer may already be committed to other common peripherals, such as mice, printer, etc. In this case several cables must be disconnected or connected to effect the link.

A second problem may exist in many cases. Often several cables must be connected to the portable computer to provide data communications in several formats as well as power system control, sequencing, and battery charging. Each interface or power cable is typically unique, requiring the user to perform several intricate manual activities every time the portable computer is to be interfaced.

Typically, users requiring data interchange are not comfortable with regularly re-configuring their computer system hardware. This is particularly true if such reconfiguration requires unnatural physical acts, such as crawling under a desk or leaning over a desk.

These are portable system expansion adapters in which the portable element rests upon the adapter in a horizontal configuration, such that the portable element's keyboard and display may be used in the docked configuration. Electrical interface is generally accomplished by means of a high density, high pin-count connector. Mechanically, the two elements typically interface through cams, hooks, and/or latching mechanisms. (One example of such a connection may be the Compaq LTE Docking Station, which is hereby incorporated by reference.) Advantages of such arrangements include: High data-rate interconnect; No user requirement to manipulate cables; Portable computer's keyboard and display usable while interfaced. Some disadvantages include: Connector/Mechanism Cost; Potentially low reliability of high-density connector; Interface alignment is critical, requiring potentially intricate user manipulations.

Innovative Computer System and Method

The present invention provides a new way to reconcile the demands and capabilities of stationary and portable personal computers. The present invention teaches a macro-system which includes at least one portable computer and at least one stationary computer, and the stationary computer system includes a docking bay in which the portable computer is physically inserted whenever the user has returned with it to his primary work area. This docking station includes contact probes which automatically make contact to a small number of contacts on the back of the portable computer whenever it is stuffed into the docking station. The portable computer preferably includes soft power switch logic, so that an activation signal, received when the portable computer is docked, can be used to wake up the portable computer and bring it up active in a slave operating mode.

The combination of spring-loaded axially-moving pins, in the docking bay, with flat contact pads on the portable unit provides a very robust structure. This structure provides great ease of use, and good reliability.

Appropriate software routines can then be triggered to maintain file coherency. For example, a TSR program or background process on the stationary computer can be used to sense whenever the portable computer has been docked, and launch a file comparison process. This process can compare all files with common path and file names, on the portable and stationary computers, to see if any of them have more recent dates shown on the portable computer. (This process can also compare the real-time clock values, of the stationary and portable computers to correct for any offset in real-time clock values.) Alternatively, of course, this file comparison and update procedure can be modified in a variety of ways familiar to designers and users of file management utilities. For example, to limit the scope of comparisons (and therefore the time required for automatic update), categories of files to be compared can be included or excluded by path name or by suffix or otherwise. For another example, the process can include a query which ascertains which portable computer has just been docked, and the process can maintain a small data file of its own listing time of last update for each possible portable computer, and the process can then simply look for files on the portable computer which have dates since the last update. Similarly, the updating in the opposite direction (from the main stationary computer to the portable computer) can be amassed by data file selection list, and also can be manually triggered, when the user is about to undock or can be automatically performed as a background process whenever the stationary computer is idle after a file save has occurred.

For durability and environmental resistance, it is inherently desirable for portable computers to fold up into some reasonably compact shape which conceals vulnerable portions as much as possible. Thus, notebook computers normally fold up, in a clam shell configuration, so that the display and keyboard are on the inside of the clam shell, and protected, when the notebook computer is closed. The present invention takes advantage of this characteristic by docking the portable computer in its closed configuration into the docking bay on the stationary computer.

No multi-pin connectors, such as are commonly used for cabling a data link, are used in the presently preferred embodiment. Instead, spring-loaded probe pins, in the stationary docking bay, are used to contact exposed flat contacts on the back side of the portable computer. More precisely, these exposed flat contacts are on whichever side of the portable computer is to be inserted first into the docking bay. If the portable computer has a handle, this would be the side opposite the handle.

Note that the present invention is not necessarily limited to "notebook" portable computers. It can also be applied to "laptop" size portable computers, or to "palmtop" or smaller portable computers. In particular, the disclosed system is not necessarily limited to portable computers which rely primarily on keyboard input. The disclosed system can also be used with portable computers which use both keyboard and stylus input, or to portable computers which use stylus input alone, or to portable computers using other input configurations as such are developed.

In the presently preferred embodiment, the docking bay is a rectangular parallelepiped, which includes internal ribs to guide portable computer into its docking position with minimal friction. However, other parallelepiped shapes can readily be substituted. In a further alternative, the docking bay may have a wedge or pyramidal shape, if the back portion of the parallel computer has a tapered wedge shape.

In any case, note that the interior of the docking bay must fit the 3-dimensional physical shape of the exterior of the portable computer.

Of course, different models of portable computers may have same external shape, and thus be usable with the same docking bay.

Note also that (provided a portable computer has the accessible docking contacts in the defined shape, with the defined electrical relations), the only element which may have to be customized to a particular portable computer model is the shape of the docking bay. However, this is simply a piece of molded plastic. Therefore, sellers of portable computers which include the contacts for such a "smart dock" can supply an appropriately customized docking bay shell, if needed, to ensure that their portable computer models will be compatible.

Some noteworthy advantages of the present invention include: docking requires only a low insertion force; No Latches, Cams, or levers need be operated for docking; the interconnect is a High-reliability Low-density interconnect; the Pin (male) elements are protected by sleeve; the Pad (female) elements on the portable unit extremely are extremely rugged; cost is low; and the system is very convenient for the user.

ESD Protection

The contacts at the back of the portable computer, in the presently preferred embodiment, are more exposed to electrostatic discharge (ESD) than are the conductors in conventional stereo, parallel, keyboard, and video connectors which may be found on the back of a normal portable computer. Thus, in the presently preferred embodiment, additional protection is provided against damaging internal electronic components by ESD.

Serial port interface chips are preferably used, inside the portable computer, for interface to these contact pads. Serial port interfaces normally include significant ESD protection. However, if additional protection is required, other known expedients can be used, such as shunt-connected Zener diodes, series-connected resistors, and/or fast-blow series fusing.

In addition, some mechanical protection against accidental fingertip contact can be provided simply by placing low ribs around and between the back contact pads.

In a further alternative embodiment, a trap door arrangement can be used to selectively expose the back contacts only when the portable has been inserted into its docking bay. However, the additional mechanical complexity this entails is highly undesirable.

In the presently preferred embodiment, the docking bay includes feet which support it in an upright position. Thus, the portable computer can be inserted into its docking bay like a book into a bookcase. However, in a contemplated alternative embodiment, the docking bay can be set to open upwards, so that the portable computer is simply lowered into the docking bay. Thus, gravity helps to maintain a good contact between the contact heads on the back of the portable computer and the probe pins inside the docking bay.

In the presently preferred embodiment, the portable computer can be inserted into the docking bay in either of two orientations. This can be accomplished in two ways. The preferred way is to include two sets of probe pins, in complementary locations inside the docking bay, so that the contact pads on the back of the portable computer will meet a set of probe pins in either orientation. Alternatively, it would be possible to define the location of the contact heads on the back of the portable computer to be symmetric, with additional logic for ascertaining which orientation is present and for rerouting signals accordingly. This is not preferred, because it places additional constraints on the designers of portable computers.

Note that if two sets of probe pins are used in the docking bay, the area of the contact pads on the back of the portable computer must fall over the axial center of the back of the portable computer, to keep the two sets of probe pins separate. Note that also this double orientation capability is an optional feature, which can be included in the docking bays for some models of portable computer and not included in the docking bays for other models of portable computers.

Note also that the location of the contact pads, on the portable computer, is not necessarily on the back of the system chassis. For instance, on a notebook computer with dimensions on the order of 7×10×2 inches, the keyboard will normally be oriented so that its width is limited only by the largest available dimension of the system chassis. Thus, the smallest of the six sides of the notebook computer will be the two end sides to the left or right of the keyboard. One of these sides will typically be taken up by a floppy disk drive, but otherwise these sides are likely to be less intensely populated than the back of the portable computer. Thus, for some models of portable computers, these sides may be the most advantageous location of the contact pads.

In the simplest embodiment, data interfaced through the contact pins is built around a serial data interface. Thus, signals routed to the back contact pads will include the three serial lines (Rx data, Tx data, ground), and preferably one pin for presence detect as well as a pair of pins for handshaking signals (such as CTS/RTS).

Note that the mechanical arrangement prevents sideways forces from being applied to the probe pins.

Preferably, the signals from the probe pins are brought into the host computer through a serial port connector. A small amount of glue logic is preferably used for presence detect; for example, a microcontroller in the portable unit can implement both presence detect and power sequencing.

Alternatively, of course, in a motherboard which is designed from scratch to accommodate this capability, a dedicated connector can be brought out to the edge of the mother board.

Note that the axially-contacted pins used in the presently preferred embodiment are not well suited for very high current density. Thus, for applications which require higher current density (e.g. for rapid recharging of batteries in a portable item), a conventional wiping contact arrangement may be better. However, if needed for such applications, the capability to manually connect a high-current contact for battery recharge can be added to the simple drop-in signal contact arrangement of the presently preferred embodiment. Alternatively, where a small amount of charging current will suffice, it can be provided by multiple axially-contacted pins connected in parallel.

BRIEF DESCRIPTION OF THE DRAWING

The present invention will be described with reference to the accompanying drawings, which show important sample embodiments of the invention and which are incorporated in the specification hereof by reference, wherein:

FIG. 4 shows a perspective view of the notebook computer of the presently preferred embodiment in the open position.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
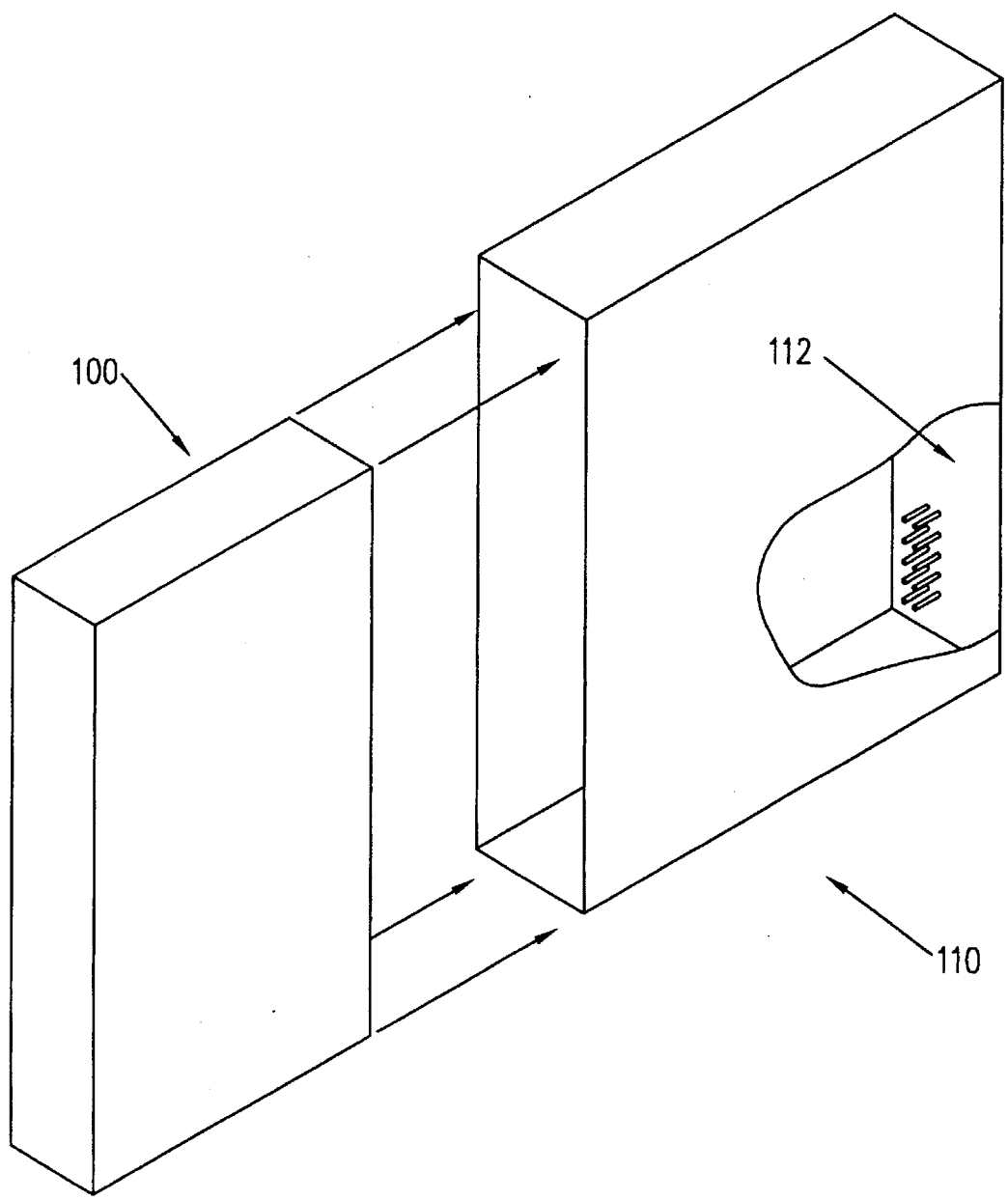
FIG. 1 shows how the portable computer, in the presently preferred embodiment, fits into the docking bay.

FIG. 1 shows how the portable computer 100, in the presently preferred embodiment, fits into the docking bay 110. This view includes a cutaway of the docking bay 110, to show the positioning of the docking pins 112, in the presently preferred embodiment.

Figure 2:
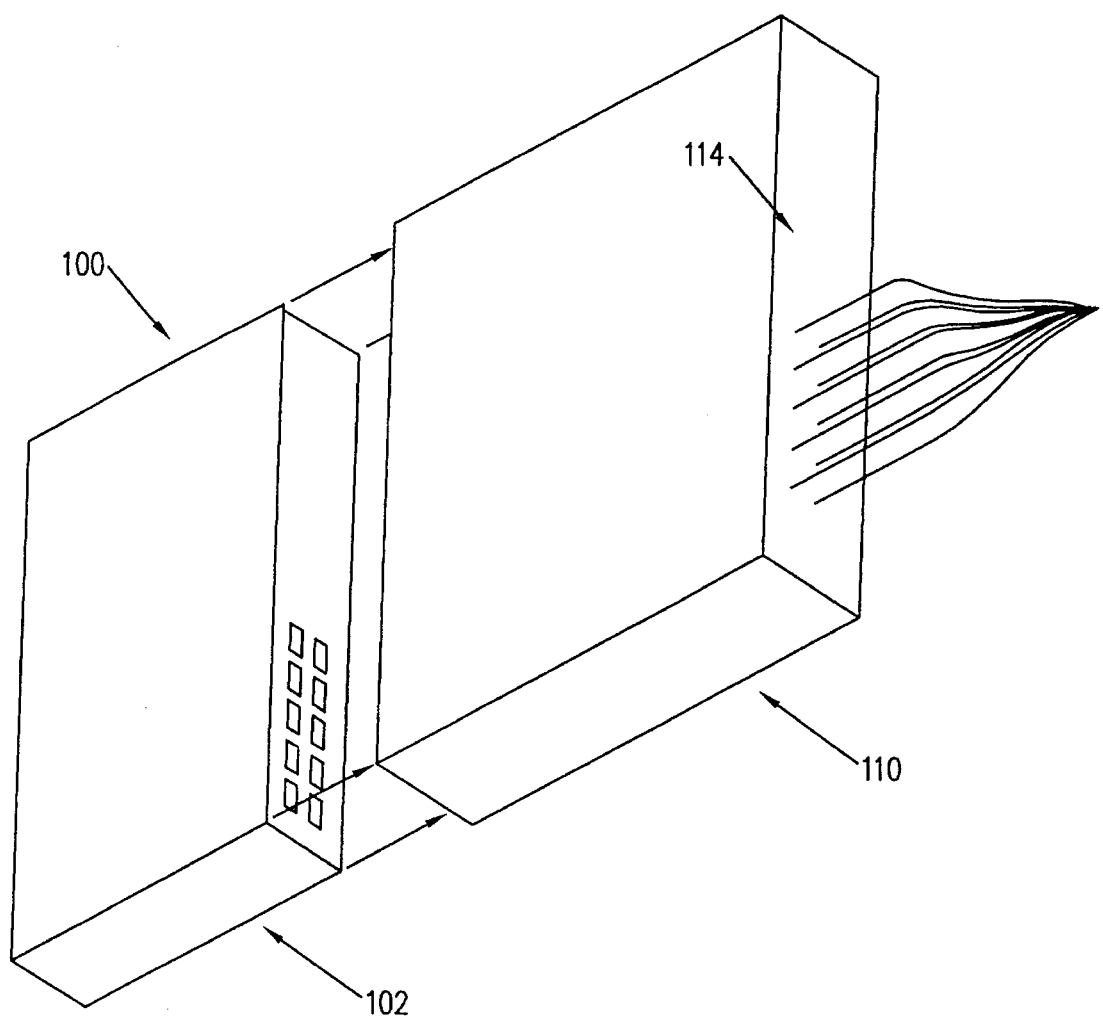
FIG. 2 is another view of the portable computer being inserted into the docking bay.

FIG. 2 is another view of the portable computer 100 being inserted into the docking bay 110. In this view, the contact pads 102 on the back of the portable computer 100 are visible. Note that the contact pads 102 have a geometry and spacing which is exactly complementary to the geometry and spacing of the pins 112 in the docking bay.

In the sample embodiment shown, ten pads 102 and ten pins 112 are used, but optionally this number can be increased or decreased.

The pads 102, in the presently preferred embodiment, are flat gold-plated metallic contacts, of about 1 cm by 0.5 cm; but of course other dimensions can be substituted.

The pins 112 are preferably spring-loaded pins, of the type known in the electronics industry as "pogo pins." Such pins are very commonly used for automated circuit board testing. These pins, in the presently preferred embodiment, each have a contact area of about 0.005 in$^2$, have a travel of about 0.25 in, have a spring constant of about 10 oz.-force per inch, and an initial spring preload of 0.5 oz.-force. Of course, these specifics are merely illustrative, and can be varied.

The docking bay 110 is shaped to stop the inward motion of the portable compute 100, when inserted, at a position which allows each of the spring-loaded pins to apply a force of about 3 ounces-force when the portable computer is fully docked.

In this embodiment, the docking bay 110 also preferably includes internal ribs (not shown) which guide the portable compute 100, when inserted, with low friction.

FIG. 2 also shows the cabling 114 which is routed to the pins 112. This cabling is preferably connected to a serial port of the stationary computer. In the simplest embodiment, no glue logic is used; but user initiation is then required to commence a file transfer.

Figure 3:
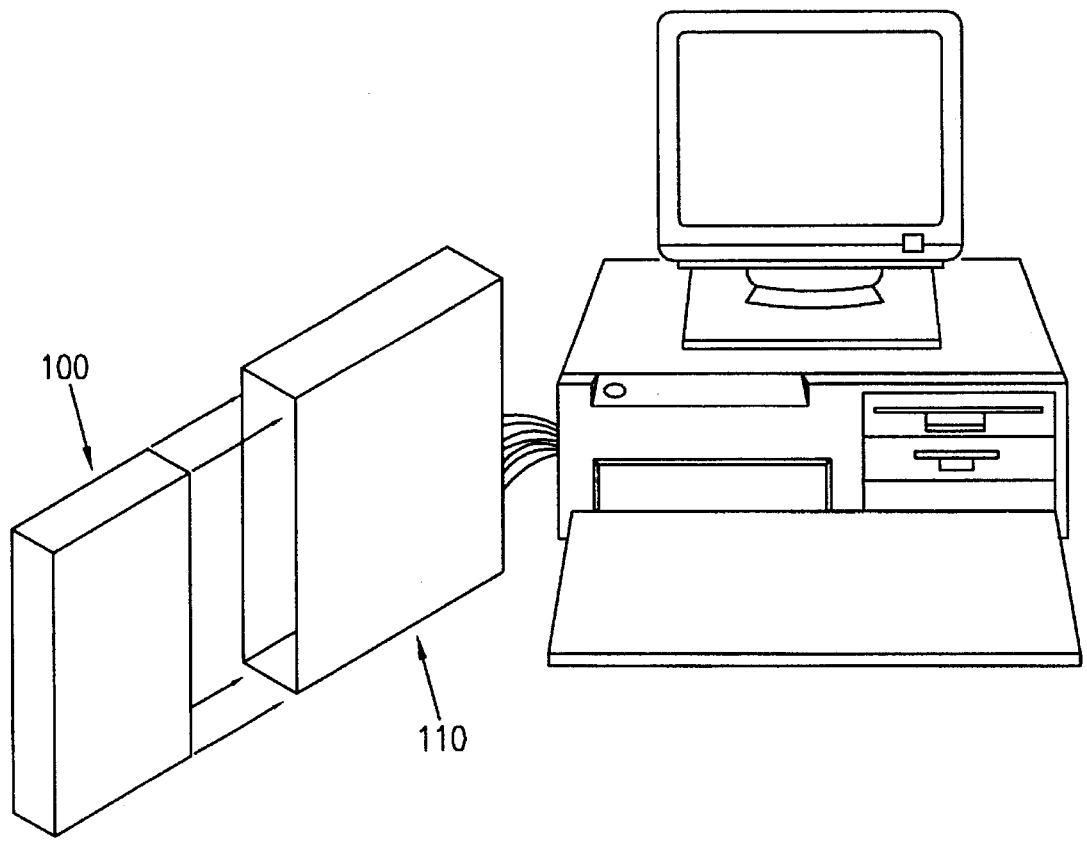
FIG. 3 shows the combination of stationary computer, portable computer, docking bay, and permanent cabling.

FIG. 3 shows the physical appearance of a sample combination of stationary computer, portable computer, docking bay, and permanent cabling.

Sample Preferred Embodiment of Stationary Computer

The claimed inventions have been implemented in the context of an 80486-based 33 MHz EISA system (the 433DE™ model from Dell Computers). That system is regarded as the presently preferred embodiment of the present invention, and will be described as such here. However, it should be understood that the disclosed innovations are also applicable to a vast variety of other system configurations; in fact, the features described are currently being designed into various other systems as well.

FIGS. 3A–3G are all parts of a single large drawing. (However, these Figures are not all to the same scale.) These Figures show the key components of the motherboard (system planar) and its daughterboards.

Figure 3A:
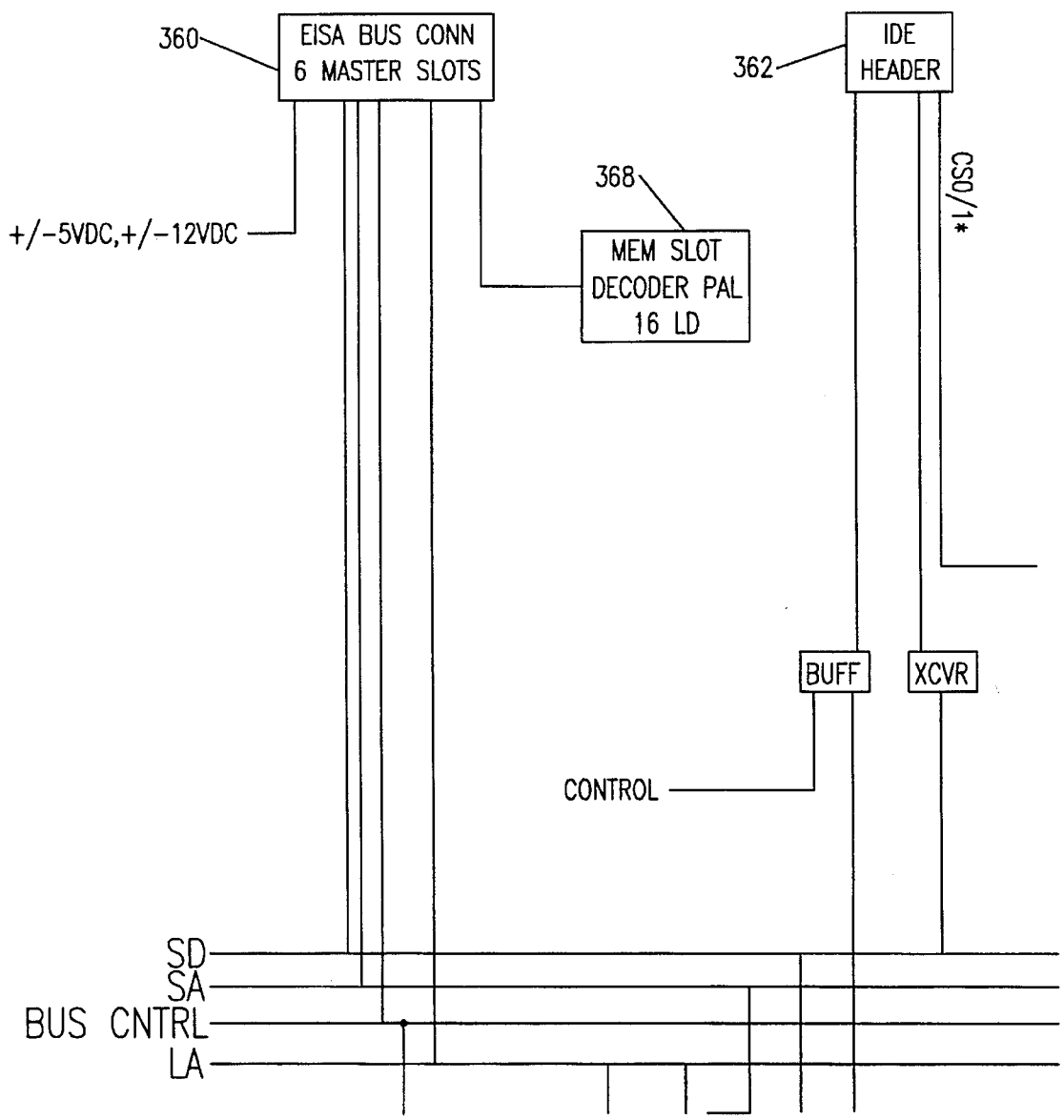
FIG. 3A shows an EISA connector which provides space for insertion of up to 6 EISA bus master cards.

FIG. 3A shows the EISA connector 360, which provides space for insertion of up to 6 EISA bus master cards (or ISA cards). This connector permits EISA accessories to access the SD, SA, and LA bus lines, (These are all conventional EISA bus lines. For more detail on the EISA bus, see, e.g., Dowden, INSIDE THE EISA COMPUTER (1990), which is hereby incorporated by reference, as well as the needed bus control signals, and also includes lines for receiving ±5 V and ±12 V power supply voltages.

FIG. 3A also shows the header 362, which is connected to the IDE drive cable inside the system chassis. This connector is linked to the X-bus through a buffer, and can also communicate with the system bus through a transceiver. This connector also receives a drive-select signal CS0/1* from the combination I/O chip 334 shown in FIG. 3B.

Figure 3B:
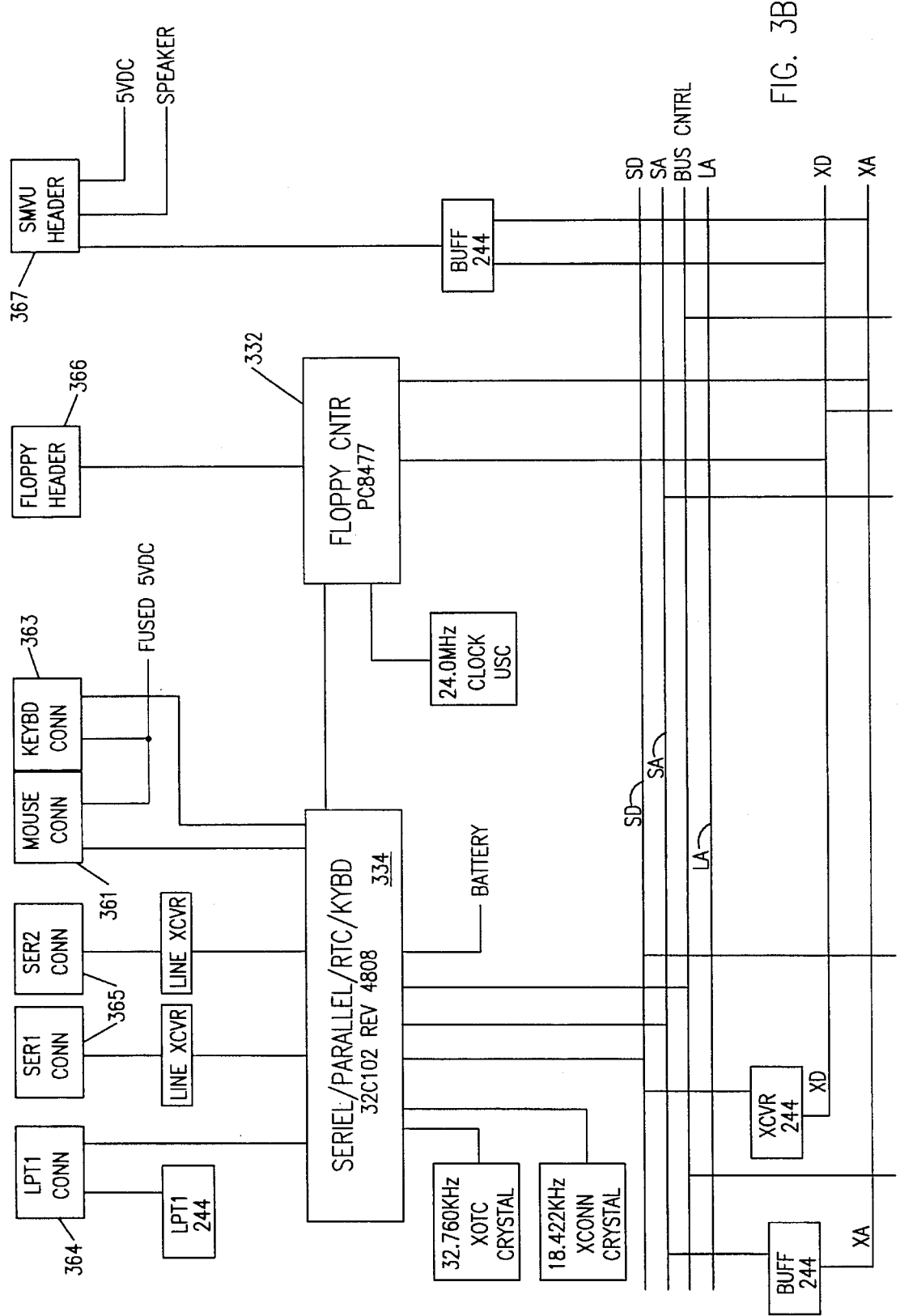
FIG. 3B shows how a combination I/O chip provides external interface capability.

FIG. 3B shows how the combination I/O chip 334 (which, in the presently preferred embodiment, is an 82C106) provides external interface capability, through parallel (printer) port 364, two serial ports 365, a mouse port 361, and a keyboard connector 363. The combination I/O chip 334 also interfaces to a floppy disk drive controller chip 332 (which, in the presently preferred embodiment, is a PCB477). Floppy disk drive controller chip 332 connects to floppy header 366, to which a ribbon cable is connected to communicate with the floppy disk drives inside the system chassis.

FIG. 3B also shows a header 367, which is used to connect to the SmartVu™ diagnostic display (The Smart Vu™ device is a very small character display in the computer chassis, which is used, under low-level control, to output status and diagnostic messages, and to the speaker.

FIG. 3B also shows the X-bus lines XA and XD. As is conventional, these lines are connected to the system bus through buffer and transceiver logic. The X-bus may be thought of as an isolate portion of the system bus. Unless communication to devices off the motherboard is required, the X-bus-to-system-bus transceivers do not have to be turned on.

Figure 3C:
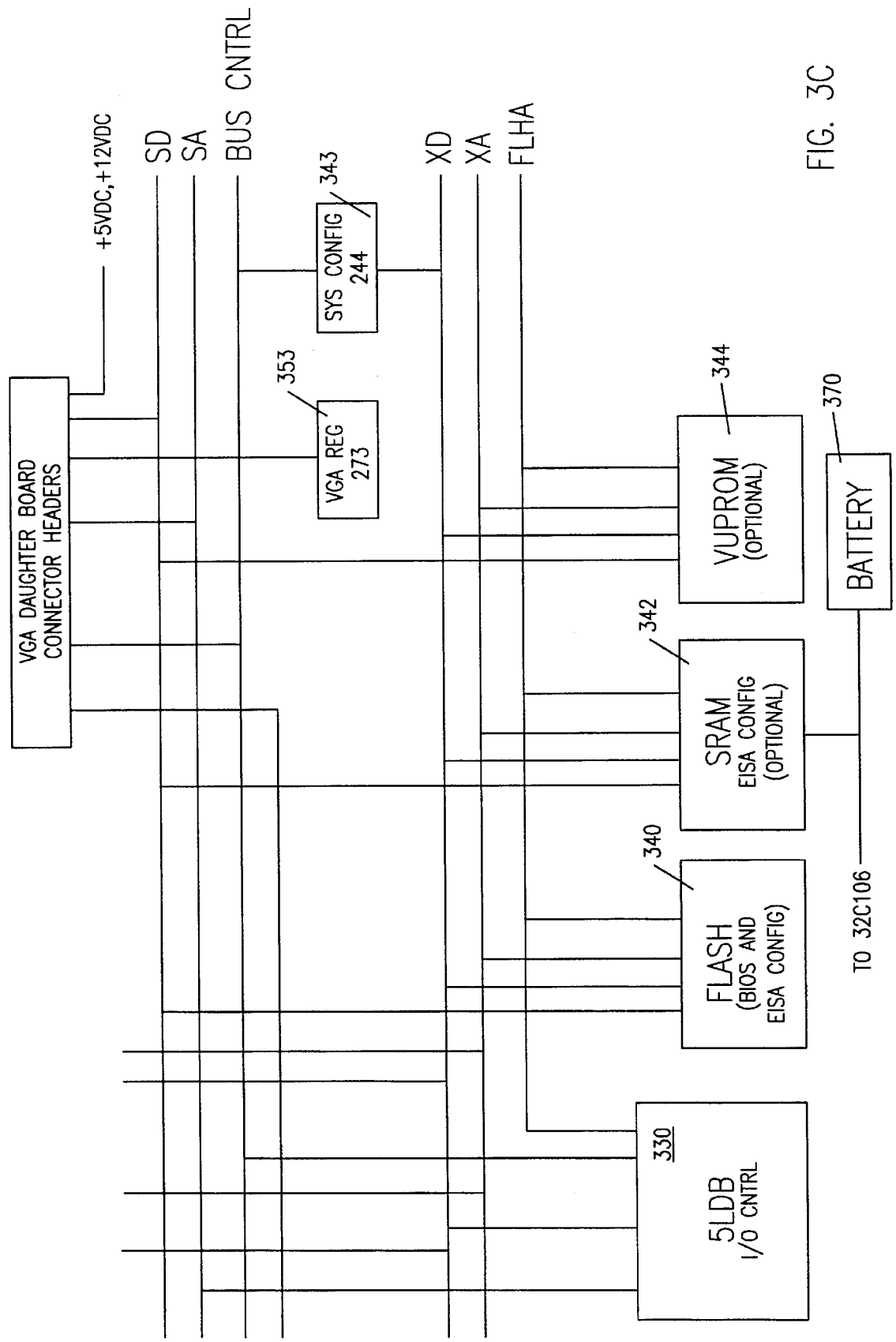
FIG. 3C shows a connector for a VGA daughterboard.

FIG. 3C shows the connector 351 for the VGA daughterboard. Note that the system bus lines are routed to this connector, but that VGA control registers 353 are connected to the X-bus. System configuration element 343 is connected to bus control lines, but is also accessible from the X-bus.

FIG. 3C also shows the boot memory 340, which, in the presently preferred embodiment, is a sector-erasable flash EEPROM. This is connected to the X-bus and to a special access line FLHA. Optional EISA configuration RAM 342 (backed by battery 370) is also connected to the X-bus as is optional boot EPROM 344. (This configuration is preferably used to provide a capability for user updates of the BIOS, as detailed in U.S. patent application Ser. No. 07/706,750, filed May 29, 1991 and now abandoned and entitled "Computer system with Restorable Basic Firmware" (DC-200), which is hereby incorporated by reference.)

FIG. 3C also shows a custom I/O management chip 330 (referred to in the drawings as "SLOB"). This ASIC chip is used to perform various housekeeping and miscellaneous functions. It is believed not to be particularly relevant to the inventions described herein; but additional detail on this chip may be found in commonly owned U.S. patent application Ser. No. 07/706,750, and now abandoned filed May 29, 1991 and entitled "Computer System with Restorable Basic Firmware" (DC-200), which is hereby incorporated by reference.

Figure 3D:
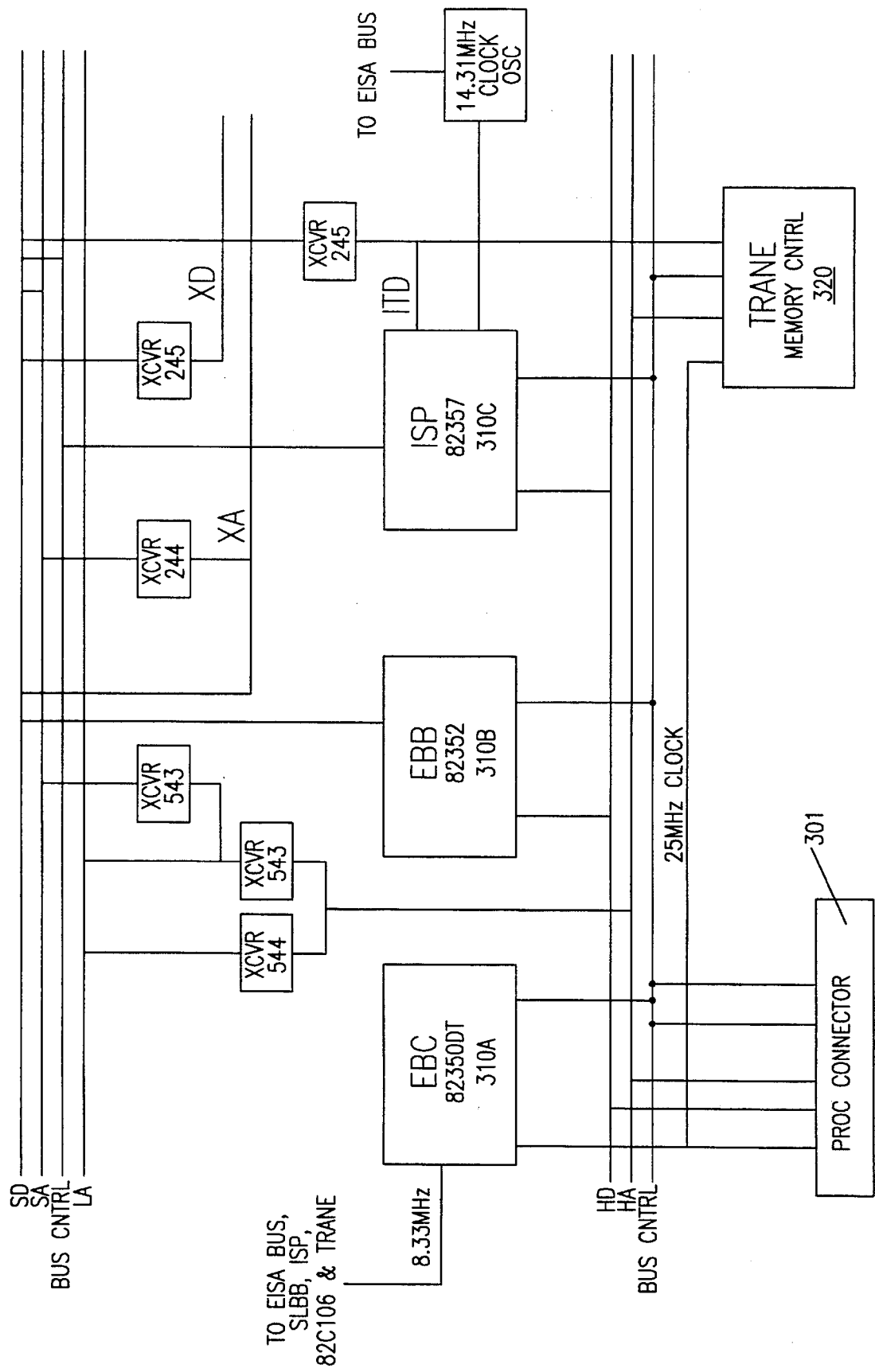
FIG. 3D shows a three-element EISA-bus chip set.

FIG. 3D shows the three-element Intel EISA-bus chip set, which happens to be used in this sample embodiment. EISA bus controller (EBC) 310A is preferably an 82358DT, EISA bus buffer (EBB) 310B is preferably an 82352, and Integrated System Peripheral (ISP) chip 310C is preferably an 82357.

FIG. 3D also shows the local (host) bus HA/HD. Note that this local bus is linked to the system bus through transceivers. This local bus is connected to a custom memory management chip 320 (referred to in the drawings as "TRANE"). This ASIC chip is used to perform various housekeeping and miscellaneous functions. It is believed not to be particularly relevant to the inventions described herein; but additional detail on this chip may be found in commonly owned U.S. patent application Ser. No. 07/706,750, and now abandoned filed May 29, 1991 and entitled "Computer System with Restorable Basic Firmware" (DC-200), which is hereby incorporated by reference. Additional connections of chip 320 are shown in FIG. 3F, and are described below. The local bus HA/HD is connected to the processor connector 301 (which leads to the processor daughterboard 300, described below). Note also that this local bus also includes control lines which are connected to the I/O management chip 330 ("SLOB").

Figure 3E:
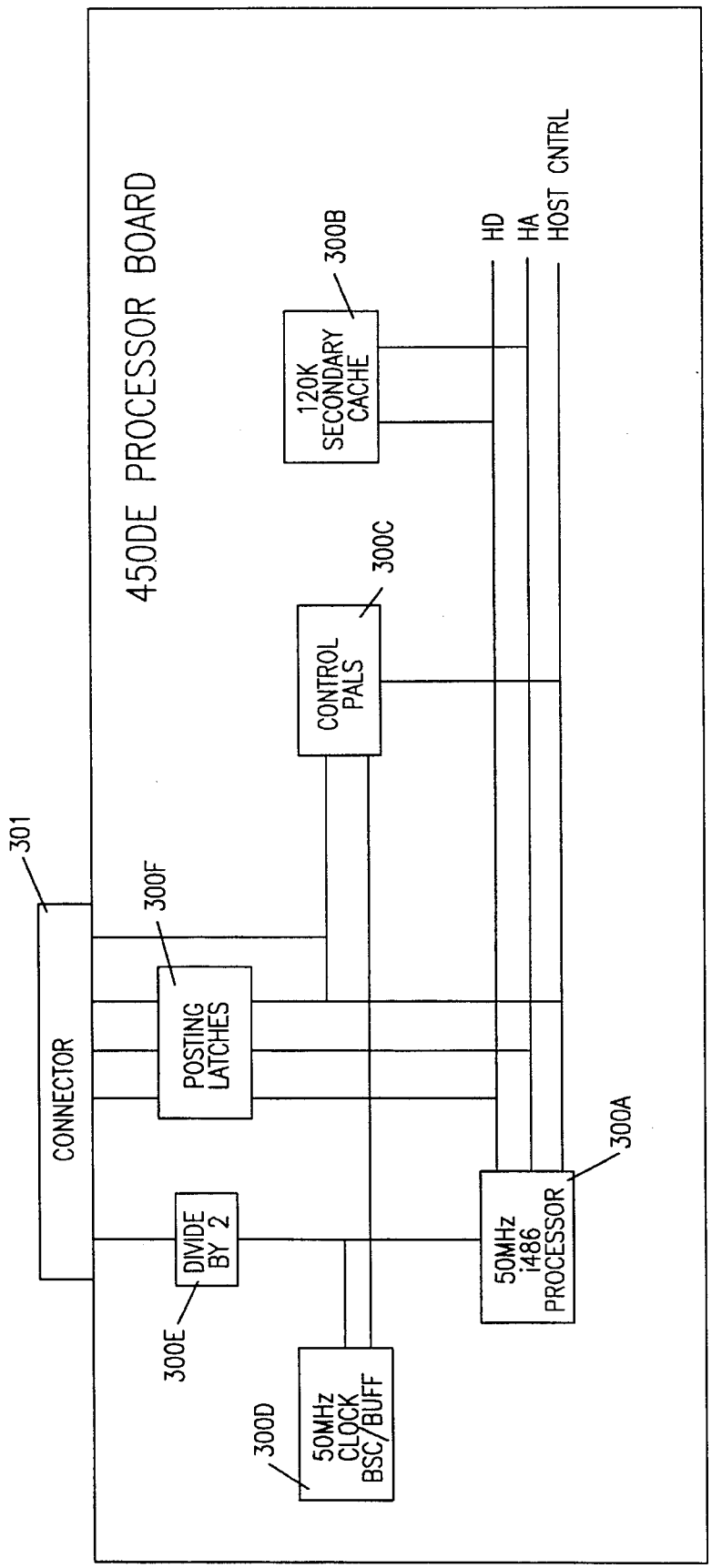
FIG. 3E shows a processor daughterboard which is accessed through a connector.
Figure 3F:
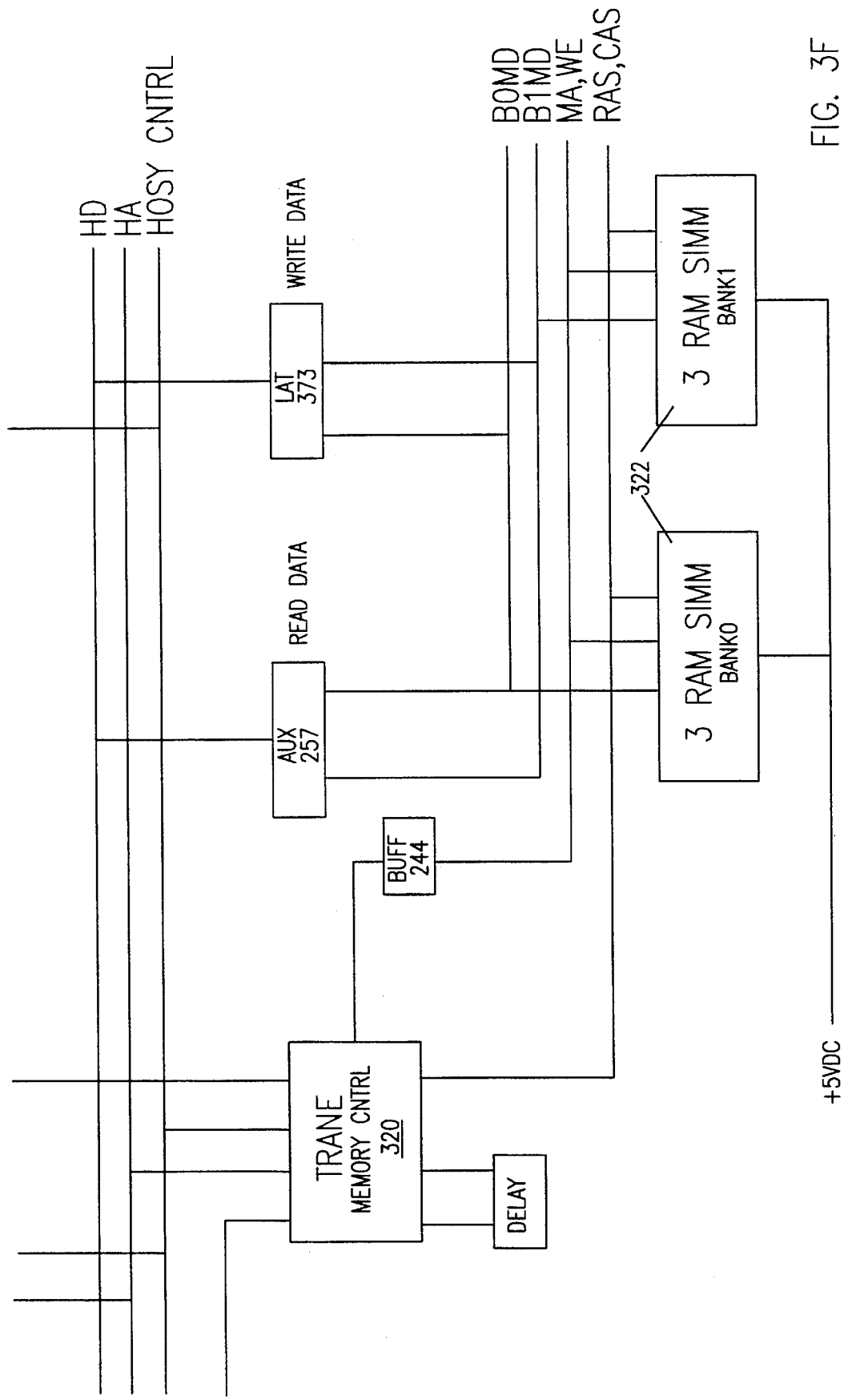
FIG. 3F shows details of the main RAM.

FIG. 3E shows the processor daughterboard 300, which is accessed through connector 301. This daughterboard includes the microprocessor 300A, as well as the microprocessor's local clock 300D and secondary cache memory 300B. In the presently preferred embodiment the microprocessor is an Intel 80486, and clock 300D operates at 33 MHz; but this board is designed to be modular, for easy substitution of processor versions. Circuit 300E divides the high-speed processor clock by 2, for routing off the daughterboard, and posting latches 300F provide secure data communication offboard. Miscellaneous control functions are included in PALs 300C.

FIG. 3F shows additional detail of the connections of 320, and of the main RAM 322. Note that RAM 322 is configured in two banks, and that conventional DRAM control signals and bank-select signals are used.

Figure 3G:
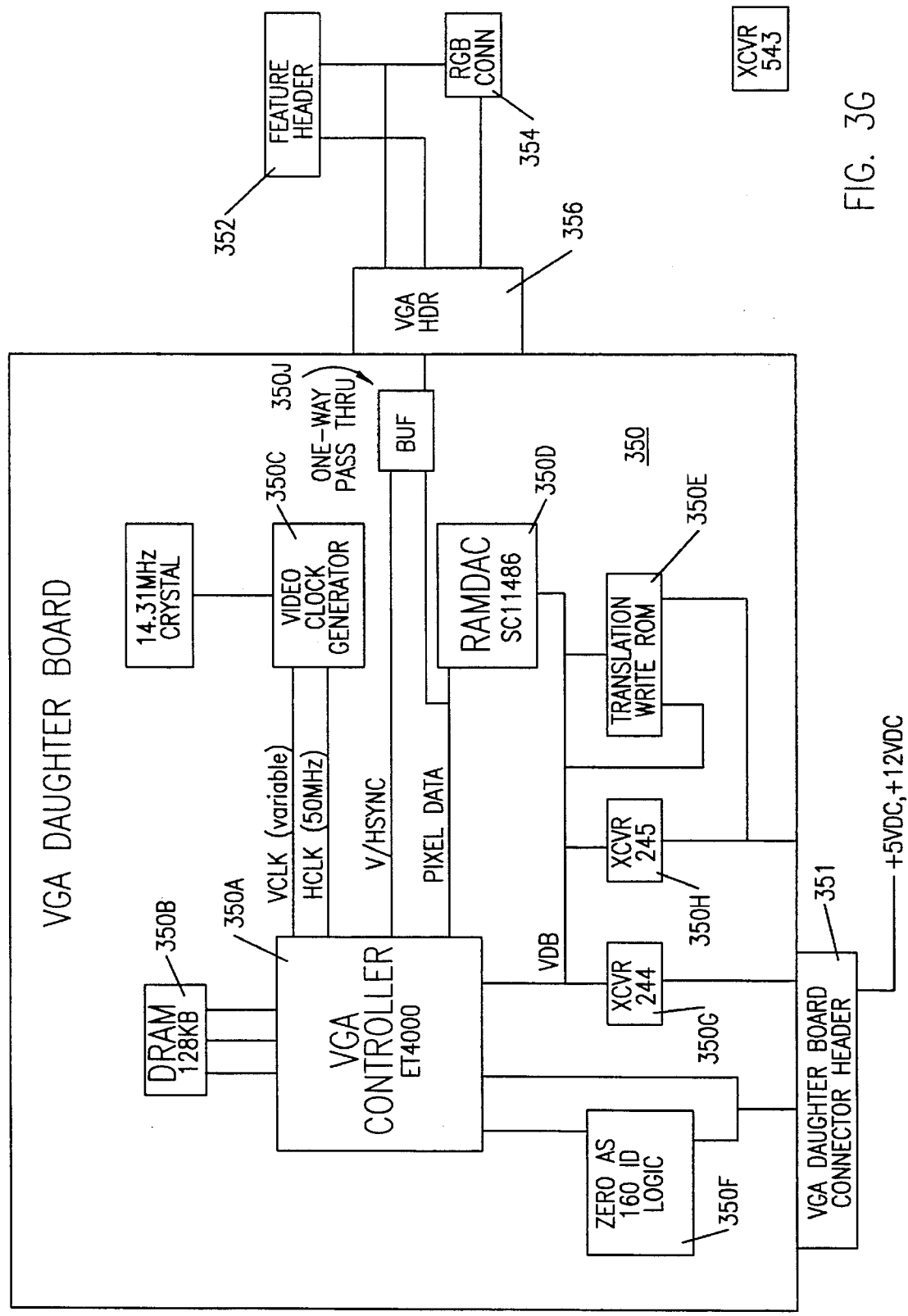
FIG. 3G shows details of the video subsystem daughterboard.

FIG. 3G shows details of the video subsystem daughterboard, which is accessed through connector 351. The VGA controller 350A, in this sample embodiment, is an ET4000, and has 1 megabyte of local DRAM 350B. Video clock generator 350C receives the constant-frequency master clock MCLK, and generates a video clock signal VCLK at a programmable frequency. The video data bus VDB connects to the VGA chip 350A and to the RAMDAC 350D (which, in the presently preferred embodiment, is an SC11486). RAMDAC 350D provides red/green/blue analog outputs, which are routed out through the daughterboard's header 356 to an externally accessible RGB connector 354. In addition, the pixel data bus is also routed out, with the synch signals, through one-way buffer 350J and header 356 to feature header 352. (This feature header can optionally be connected to a higher-performance video card, to make use of that card's DAC.) ID logic 350F is a PAL which generates the control signal for shortening memory cycles on the bus, to achieve zero-wait-state accesses. Buffer 350G, transceiver 350H, and translation write ROM 350E provide simple interface-management functions.

Sample Preferred Embodiment of Portable Computer

The sample embodiment which is currently regarded as the presently preferred best mode is the Dell 320N computer. This is a notebook computer, with an external closed size of about 8.5×11×2 inches. However, the disclosed innovations are also applicable to a wide variety of other portable computers, including not only notebook computers, but also palmtops, clip-ons, and computers in other form factors.

FIG. 4 shows a perspective view of the notebook computer of the presently preferred embodiment in the open position. Visible elements include case 802, cover 804, hinges 806, display screen 810, keyboard 820, floppy disk drive 830, and dust cover 803 (which covers the receptacle for the rechargeable battery pack).

The microprocessor 400 is an Intel 386SX processor running at 20 MHz. (Hardware details and options of this computer, in the presently preferred embodiment, are extensively described in readily available Dell product literature, which is hereby incorporated by reference.) However, this model is merely one example of the hardware environments in which the inventions have been demonstrated to work.

In the presently preferred embodiment, an HT21 chip 410, from Headland Technologies, is used to provide a variety of peripheral support functions to the main microprocessor. These include bus management, memory management, interrupt control, and DMA control. Serial port management and keyboard interface, and other I/O management functions, are provided by a VTI 82C186 combination chip 450. Of course, other implementations of support logic and glue logic can be used if desired, within this well-known architecture.

FIGS. 4A–4E show the detailed structure of the preferred hardware embodiment of the portable computer.

This computer is a notebook computer, which includes a compact keyboard and screen in a rugged plastic case with a battery power supply.

Figure 4A:
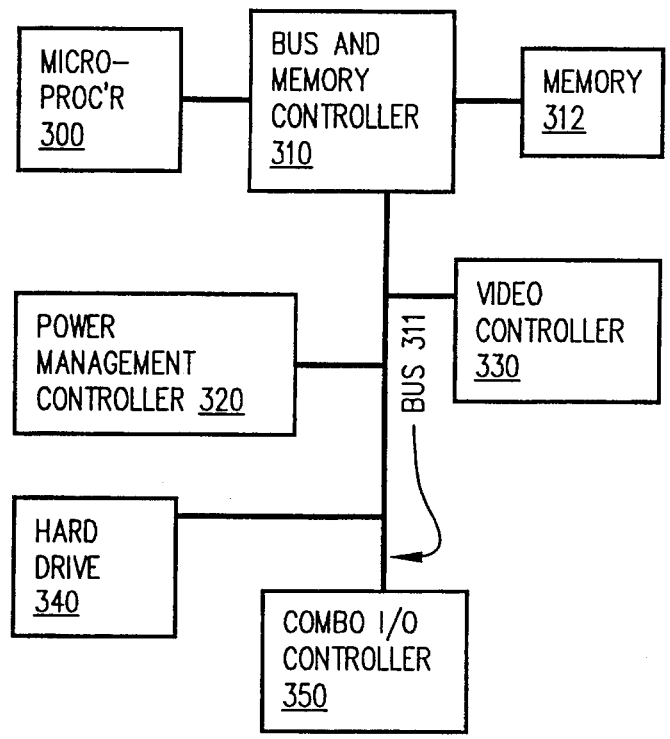
FIG. 4A shows the principal electronic components of hardware architecture.

FIG. 4A gives an overview of the principal electronic components of hardware architecture.

Microprocessor 400, in the presently preferred embodiment, is a 386SX processor running at a 20 MHz clock rate. This microprocessor accesses bus 411, and memory 412, through controller 410. Bus and memory controller 410, in the presently preferred embodiment, is HT21 chip from Headland Technologies. This chip provides a variety of peripheral support functions to the main microprocessor, including bus management, memory management, interrupt control, and DMA control.

Bus 411, in the presently preferred embodiment, is an ISA bus. Memory 412, in the presently preferred embodiment, is DRAM, as discussed below.

Figure 4B:
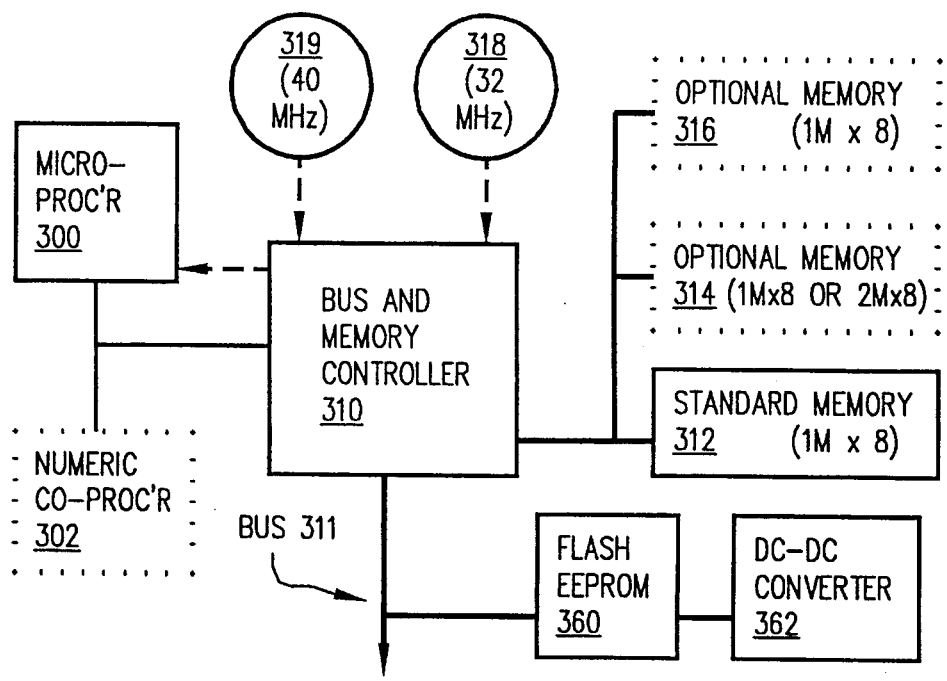
FIG. 4B shows details of the connections of a microprocessor and a bus controller.
Figure 4C:
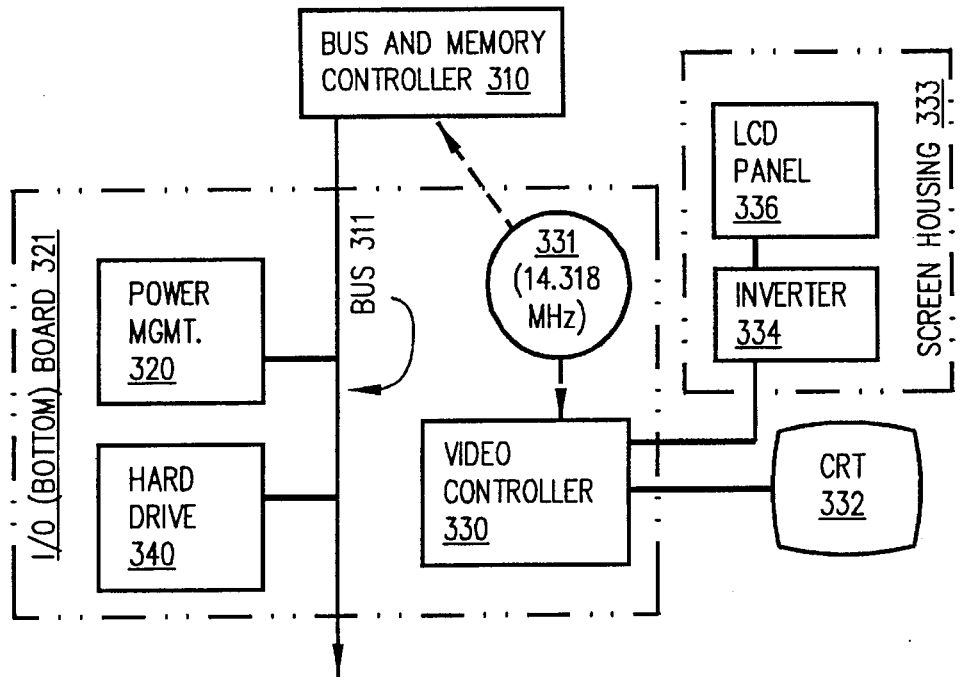
FIG. 4C shows details of the connections of a video controller.

Video controller 430 is, in the presently preferred embodiment, a VGA chip, and is connected to additional components as shown in FIG. 4C below. This is implemented as a WD 90C20 VGA controller chip, in the presently preferred embodiment; but of course other components can optionally be used instead.

Figure 4D:
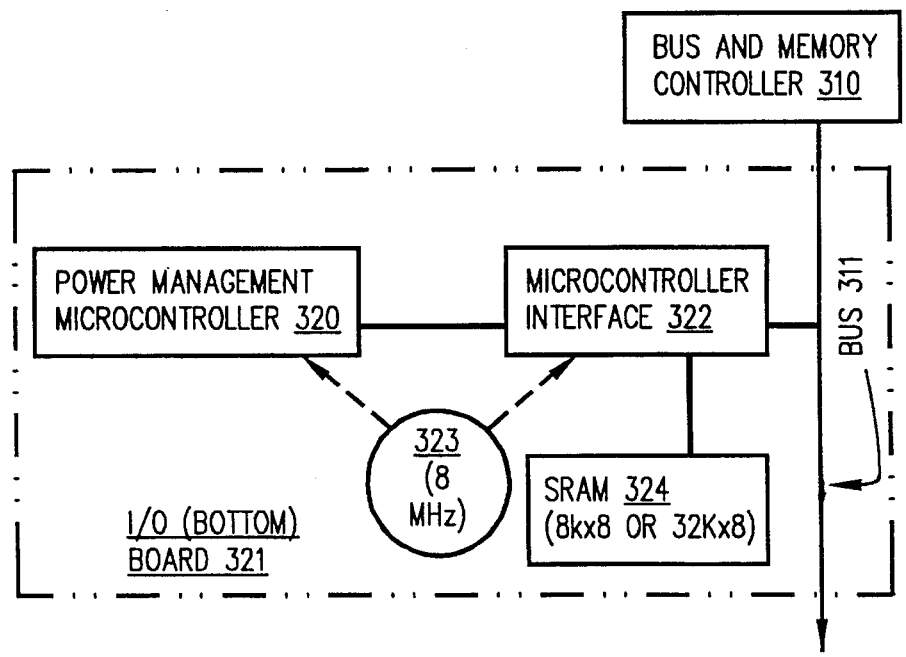
FIG. 4D shows details of the connections of a power management microcontroller.

Power Management Controller 420 is a microcontroller, in the presently preferred embodiment, and is connected to additional components as shown in FIG. 4D below.

Hard disk drive 440, in the presently preferred embodiment, is a ruggedized 2½" IDE drive, such as the Conners Peripherals 242 40MB 2.5" hard disk. (Other sizes are also available.)

Figure 4E:
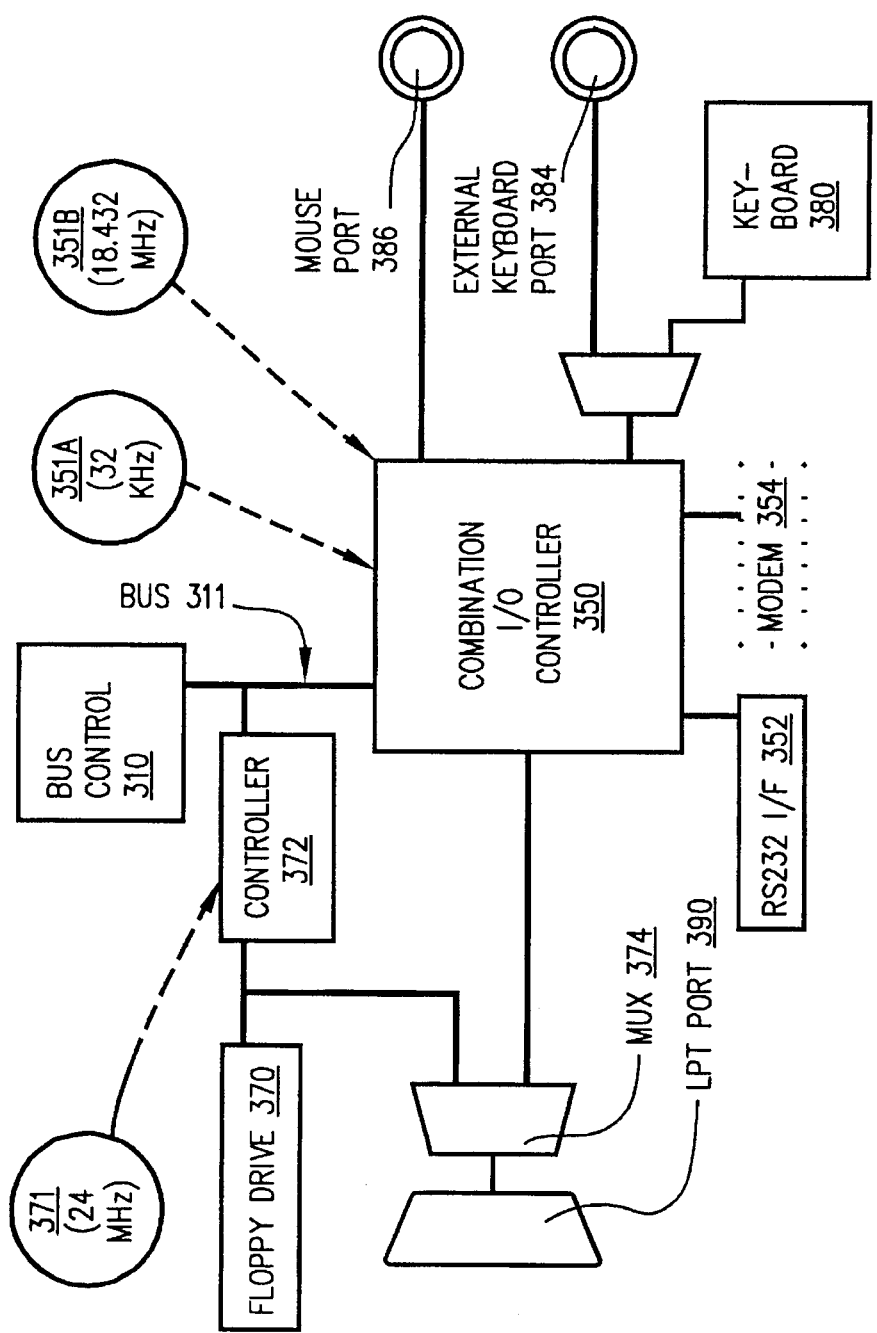
FIG. 4E shows details of the connections of a combination I/O controller.

Serial port management and keyboard interface, and other I/O management functions, are provided, in the presently preferred embodiment, by a VTI 82C186 combination chip 450. (Of course, other implementations of support logic and glue logic can be used if desired, within this well-known architecture.) Combination I/O Controller 450 is connected to additional components as shown in FIG. 4E below.

FIG. 4B shows additional details of the connections of microprocessor 400 and bus controller 410. The microprocessor 400 is connected in parallel with a socket for an optional numeric co-processor 402 (e.g. a 387SX chip). Bus controller 410 receives two oscillator inputs. A 40 MHz crystal-controlled oscillator 419 provides a signal which is divided down to provide the clock for microprocessor 400. A 32 MHz crystal-controlled oscillator 418 provides a signal which is divided down to provide the clock for bus 411.

The standard component of memory 412 is one megabyte of DRAMs, 8 bits wide. Sockets are provided for optional expansion memory 414 (1M×8 or 2M×8), and for optional expansion memory 416 (2M×8). Both of these optional expansion memories are connected in parallel with memory 412 (except for slightly different address line connections).

Flash EEPROM 460 provides a rewritable boot memory. (The operation of this memory is described in detail in commonly owned application Ser. No. 07/707,121 filed May 29, 1991 now U.S. Pat. No. 5,388,267, entitled "Method and Apparatus for updating and restarting system BIOS functions while maintaining BIOS integrity" (DC-200), which is hereby incorporated by reference.) When the flash memory 460 must be programmed, DC-DC converter 462 generates a 12-Volt programming voltage from the 5-Volt supply.

The hardware system of the presently preferred embodiment uses only three circuit boards for all components other than the power supply. The components shown in FIGS. 4B and 4E are included on a common circuit board. However, FIGS. 4C and 4D show components which are on an I/O (bottom) circuit board 421 or inside the screen housing 433.

FIG. 4C shows additional details of the connections of the video controller 430. A 14.318 MHz crystal-controlled oscillator 431 provides a reference frequency to video controller 430 and to bus controller 410. The video controller provides video output to inverter 434 and LCD display panel 436. (This is a Sharp VGA flat panel display, in the presently preferred embodiment, but of course other displays can be substituted.) A connection is also provided, in the presently preferred embodiment, for an external CRT monitor 432, which, if connected, can also be supplied with video signals from video controller 430.

FIG. 4D shows additional details of the connections of the power management microcontroller 420. In the presently preferred embodiment, this is a National Semiconductor COP888CF series microcontroller, which is connected to receive various inputs for power-monitoring. An ASIC 422 provides interface logic, including sequential logic, for interfacing the microcontroller 420 to the system bus 411. An 8 MHz crystal-controlled oscillator 423 provides a clock signal to microcontroller 420 and interface chip 422. An SRAM 424 (which may be 8K×8 or 32K×8) is also accessed through the interface chip 422. This provides local memory which the microcontroller 420 can use. U.S. patent application Ser. No. 07/655,889, now U.S. Pat. No. 5,410,711 filed Feb. 14, 1991 and entitled "Portable Computer with BIOS-independent Power Management" (DC-172), provides extensive detail concerning power management microcontroller 420 and ASIC 422. This application is hereby incorporated by reference.

FIG. 4E shows additional details of the connections of the combination I/O controller 450. This chip receives clock inputs from an 18.432 MHz crystal-controlled oscillator 451B, and from a 32 KHz crystal-controlled oscillator 451A. This chip, in the presently preferred embodiment, is a VTI 106; but of course a variety of other combination I/O management chips are available from Headland, Chips & Technologies, and other vendors, and other such chips can optionally be designed in.

I/O controller 450 is connected to receive input from mouse port 486.

I/O controller 450 is also connected to receive input from built-in keyboard 480, or from an external keyboard when one is plugged into external keyboard port 484.

I/O controller 450 is also connected to communicate with an internal modem 454, if one is installed.

I/O controller 450 is also connected to communicate, through RS232 interface 452, with a serial port connector (not shown).

I/O controller 450 is also connected to communicate, through multiplexer 474, with printer (parallel) port 490. Note that multiplexer 474 also, in the presently preferred embodiment, permits the floppy disk controller 472 to send and receive floppy disk interface signals over the parallel port connector 490. This novel feature permits an external floppy drive to be connected to the printer port connector 490.

Floppy disk controller 472 interfaces to bus 411, and receives a clock signal from 24 MHz oscillator 471. Floppy disk controller 472 is a standard controller for a 3½" floppy disk drive 470, which, in the presently preferred embodiment, is an Epson 3.5" floppy disk drive unit.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the disclosed innovations can be especially useful in a three-computer system. For example, a user's portable computer can be used (along with its normal applications usage) as a data shuttle for automatically maintaining file coherence between a single user's home and office systems.

As noted above, the presently preferred embodiment uses no contact wiping, and this is believed to be advantageous; but in alternative embodiments some contact wiping may be allowed. (For example, the spring retraction mechanism can be modified to add some twist to the pin's movement.) However, this adds mechanical complexity, and hastens the wearout of pins and pads.

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A system, comprising:

a first computer system, including, in one or more physical housings, at least one central processing unit (CPU), program memory, at least one input device, and a display;

a second computer system, including, in a single hand-portable housing, at least one central processing unit (CPU), program memory, at least one input device, and a display, said housing of second computer system being smaller in overall size than housings of said first computer system;

a docking bay, comprising a recess which is large enough to accept insertion of said housing of said second computer system, and which is complementary to the external shape of said housing of said second computer system, and which is shaped to constrain said housing of said second computer system to a single direction of motion during insertion;

wherein said first and second computer systems are each separately operable as fully programmable stand-alone computer systems;

and wherein said docking bay includes spring-loaded, pogo-type pins mounted in the interior thereof, said pins being positioned to be axially compressed in said single direction when said housing of said second computer system is inserted within said docking bay;

and wherein said pins of said docking bay are connected to provide a data interface to said first computer system;

and wherein said second computer system includes contact pads, in the exterior thereof, which are connected to provide a serial data interface to said CPU of said second computer system;

and wherein said first and second computer systems are configured to automatically detect a connection between said pins and said contact pads, and to automatically call a data transfer program in response to a detection of said connection for transferring files bidirectionally between said first and second computer systems to thereby maintain file coherency.

2. The system of claim 1, wherein said housing of said second computer system is foldable into a compact configuration, and said docking bay is complementary to said housing of said second computer system in said compact configuration.

3. The system of claim 1, wherein said second computer system includes presence detect logic which is configured and connected to detect connection between said pins and said contact pads.

4. The system of claim 1, wherein said first computer system is a desktop system.

5. The system of claim 1, wherein said single direction is substantially horizontal.

6. The system of claim 1, wherein said single direction is substantially vertical.

7. The system of claim 1, wherein said pins of said docking bay are connected to a multistrand cable which is removably connected to said first computer system.

8. The system of claim 1, wherein said first computer system has a basic CPU clock rate which is more than 50% greater than that of said second computer system.

9. The system of claim 1, wherein said first computer system has more than twice as much maximum available memory bandwidth as said second computer system.

10. The system of claim 1, wherein said first computer system has more than three times as much on-line mass storage capacity as said second computer system.

* * * * *